US008527263B2

(12) United States Patent
Bradley et al.

(10) Patent No.: US 8,527,263 B2
(45) Date of Patent: Sep. 3, 2013

(54) METHOD AND SYSTEM FOR AUTOMATICALLY GENERATING REMINDERS IN RESPONSE TO DETECTING KEY TERMS WITHIN A COMMUNICATION

(75) Inventors: Lisa Bradley, Cary, NC (US); Geetika Tandon, Silver Spring, MD (US); FuYi Li, Sudbury, MA (US); Valerie Bennett, Macon, NC (US)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 12/166,218

(22) Filed: Jul. 1, 2008

(65) Prior Publication Data
US 2010/0004922 A1 Jan. 7, 2010

(51) Int. Cl.
G06F 17/27 (2006.01)
G06F 19/00 (2011.01)
G06F 15/16 (2006.01)
G10L 21/00 (2006.01)
H04L 29/06 (2006.01)
H04M 1/00 (2006.01)
H04M 3/00 (2006.01)
H04M 15/06 (2006.01)

(52) U.S. Cl.
USPC .......... 704/9; 704/270; 704/201; 379/265.02; 379/142.17; 709/204; 709/201; 455/563; 455/414.3; 701/29.5

(58) Field of Classification Search
USPC .................................................... 704/9, 270
See application file for complete search history.

(56) References Cited

U.S. PATENT DOCUMENTS

| 7,006,881 | B1 * | 2/2006 | Hoffberg et al. ............. 700/83 |
|---|---|---|---|
| 7,043,439 | B2 * | 5/2006 | Jost et al. .................. 704/275 |
| 7,334,000 | B2 * | 2/2008 | Chhatrapati et al. ............ 1/1 |
| 8,108,206 | B2 * | 1/2012 | Hufnagel et al. ............. 704/9 |
| 8,145,274 | B2 * | 3/2012 | Gandhi et al. .............. 455/563 |
| 8,222,994 | B1 * | 7/2012 | Sagar .................... 340/7.52 |
| 2002/0076015 | A1 * | 6/2002 | Norwitz et al. .......... 379/93.09 |
| 2004/0102962 | A1 * | 5/2004 | Wei ...................... 704/201 |
| 2004/0249529 | A1 * | 12/2004 | Kelly et al. ............... 701/30 |
| 2005/0074113 | A1 * | 4/2005 | Mathew et al. ........ 379/265.02 |
| 2005/0273334 | A1 * | 12/2005 | Schleifer et al. .......... 704/255 |
| 2005/0273493 | A1 * | 12/2005 | Buford et al. ............ 709/204 |
| 2006/0106854 | A1 * | 5/2006 | Haigh et al. ............. 707/102 |
| 2006/0217967 | A1 * | 9/2006 | Goertzen et al. .......... 704/201 |
| 2007/0004383 | A1 * | 1/2007 | Agozo .................. 455/414.1 |
| 2007/0036299 | A1 * | 2/2007 | Marsh et al. ........... 379/88.22 |
| 2007/0100631 | A1 * | 5/2007 | Bodin et al. ............ 704/270 |

(Continued)

OTHER PUBLICATIONS http://www-306.ibm.com/software/lotus/products/connections/activities.html.

(Continued)

Primary Examiner — Pierre-Louis Desir
Assistant Examiner — Neeraj Sharma
(74) Attorney, Agent, or Firm — Novak Druce Connolly Bove + Quigg LLP (57) ABSTRACT

A computer-implemented method of automatically generating an electronic reminder is provided. The method includes identifying, using term-recognition circuitry, at least one key term within an electronic message received with an electronic communications device. The method further includes generating at least one reminder based upon the at least one key term. One or more reminders are, according to the method, electronically conveyed to a user at a time later than when the message was received.

15 Claims, 6 Drawing Sheets

(56) References Cited

U.S. PATENT DOCUMENTS

| | | | | |
|---|---|---|---|---|
| 2008/0114714 | A1* | 5/2008 | Vemuri | 706/48 |
| 2009/0136013 | A1* | 5/2009 | Kuykendall et al. | 379/142.17 |
| 2009/0140855 | A1* | 6/2009 | Shemesh et al. | 340/540 |
| 2009/0149166 | A1* | 6/2009 | Habib et al. | 455/414.3 |

OTHER PUBLICATIONS http://task-lists.garchive.org.
http://www.rememberthemilk.com.
http://www.jott.com.
http://www-306.ibm.com/software/lotus/products/connections/activities.html, Oct. 12, 2007.
http://task-lists.qarchive.org, Dec. 23, 2007.
http://www.rememberthemilk.com, Jan. 21, 2008.
http://www.jott.com, Jan. 18, 2008.

* cited by examiner

METHOD AND SYSTEM FOR AUTOMATICALLY GENERATING REMINDERS IN RESPONSE TO DETECTING KEY TERMS WITHIN A COMMUNICATION

FIELD OF THE INVENTION

The present invention is related to the field of electronic communications, and more particularly, to analyzing a received electronic communication and generating an electronic reminder based on one or more key terms identified within the received communication.

BACKGROUND OF THE INVENTION

The number of different modes of electronic communications has expanded beyond conventional circuit-switched telephone communications. Simultaneously, reliance on electronic communications over different types of communication networks has become more pervasive.

Not surprisingly, increasing numbers of people are receiving more and more messages thorough through various forms of electronic communications. These communications include, for example, messages received over a cellular or mobile telephone, messages recorded by a voice messaging system, messages received through an instant messaging device, as well as visual, text, and voice messages received with a computing device communicatively linked to a packet-switched network such as the Internet.

Although these varied modes of electronic communication provide many advantages, there is yet a problem that arises if many messages from many sources are received too frequently or if even a single message is received when the receiver has no opportunity to prepare a reminder pertaining to the received message. The problem arises when the received message conveys instructions or a request that some future action be taken by the message receiver. At any given moment, the receiver may not find it convenient or may not have the necessary paraphernalia, such as a piece of paper and pencil, to prepare a reminder regarding the message.

There currently exist e-mail systems with which a receiver can copy an e-mail into a to-do list or manually create a to-do reminder, and the system will keep track of the reminder, ascertain its priority, and note when an action is to be taken. With such a system, however, it is typically necessary that the user take time to fill in the particular details of which the user wishes to be reminded. Moreover, the user typically must remember to electronically move the e-mail into an appropriate portion of the system's memory so as to place it within a to-do list.

SUMMARY OF THE INVENTION

In view of the foregoing background, it is therefore a feature of the invention to enable the automatic creation of "to-dos" or other reminders. It is a further feature that the reminder can be automatically generated on the basis of key words recognized within an electronic or voice conversation conveyed in an instant message, e-mail, phone call, or other mode of communication. This and other features and advantages in accordance with the present invention are provided by the methods and systems described herein.

One embodiment of the invention is a computer-implemented method of automatically generating an electronic reminder. The method can include identifying using term-recognition circuitry at least one key term within an electronic message received with an electronic communications device. The method can further include generating at least one reminder based upon the one or more key terms, the one or more reminders being electronically conveyed to a user at a time later than when the message was received.

Another embodiment of the invention is a system for automatically generating an electronic reminder. The system can include a device interface adapted to communicatively link to a communications system or device. Additionally, the system can include term-recognition circuitry for identifying at least one key term within an electronic message received by the communications system or device. The system can further include a reminder generator for generating at least one reminder based upon the at least one key term. The one or more reminders are electronically conveyed by the system to a user at a time later than when the message was received.

Still another embodiment of the invention is computer-readable medium in which computer-readable code is embedded. When loaded on and executed by a computer system, the computer-readable code can cause the computer system to perform the steps of: identifying using term-recognition circuitry at least one key term within an electronic message received with an electronic communications device; and generating at least one reminder based upon the at least one key term, the at least one reminder being electronically conveyed to a user at a time later than when the message was received.

BRIEF DESCRIPTION OF THE DRAWINGS

There are shown in the drawings, embodiments which are presently preferred. It is expressly noted, however, that the invention is not limited to the precise arrangements and instrumentalities shown in the drawings.

DETAILED DESCRIPTION

The invention is directed to methods and systems for analyzing a received electronic communication and generating an electronic reminder based on one or more key terms identified in the received communication. The reminder can be a "to-do" reminder that is later conveyed to a user to remind the user of an action to be performed or an event to take place. As described herein, the reminder can be automatically generated on the basis of the key words recognized within an electronic or voice conversation conveyed in an instant message, e-mail, phone call, or other mode of communication.

Figure 1:
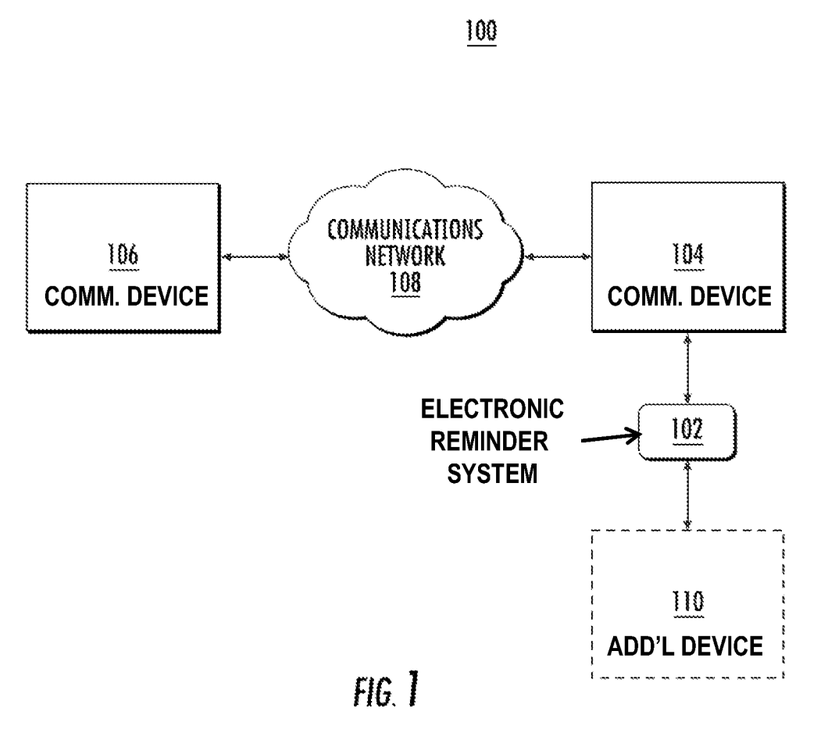
FIG. 1 is a schematic view of an exemplary communications network in which a system for automatically generating an electronic reminder, according to one embodiment, can be utilized.

FIG. 1 is a schematic view of an exemplary communications network 100 in which a system 102 for automatically generating an electronic reminder, according to one embodiment, can be advantageously deployed. The exemplary communications network 100 illustratively includes a communication device 104 communicatively linked to another communications device 106, the former for receiving an electronic message from the latter. Although the communications devices 104, 106 are illustratively connected via a communications network 108, in alternate embodiments the communication devices can communicate directly with one another. Each communications device 104, 106 can be a voice-based communication device, such as a conventional telephone, cellular or mobile phone, or a voice-enabled computing device configured to transmit and receive voice over the Internet or other packet-switched network. Additionally, or alternatively, one or both devices 104, 106 can be devices for receiving text-based messages, such as an instant message, or other type of message that can be displayed on a screen or contained within a printed output.

The system 102 for automatically generating an electronic reminder is shown as distinct from, but directly connected to, the communication device 104 that receives an electronic message. In alternate embodiments, however, the system 102 can be integrated within the circuitry of the communication device 104 for performing the processes and functions described herein. In still other embodiments, though, the system 102 can be remotely located from, rather than co-located with, the communication device 104. Moreover, in various embodiments, the system 102 can communicate with the communication device 104 directly or through a communications network, either through a wireless or wired connection. Optionally, the system 102 can communicatively link to another device 110, either directly (as illustrated) and/or through the communications network 108. This arrangement allows the system 102 to generate a reminder based on an electronic message received by one device 104 and to subsequently convey the reminder to a user through a different device 110.

Reminders (e.g., a "to-do" reminder) can be conveyed to a user via e-mail, over a telephone, or in the form of an Instant Message. In one embodiment, such reminders can be processed at central location and then conveyed to a user through one or more configured devices (i.e., a user can elect to have the reminder send to the user via one communication device or multiple devices that are active.)

Figure 2:
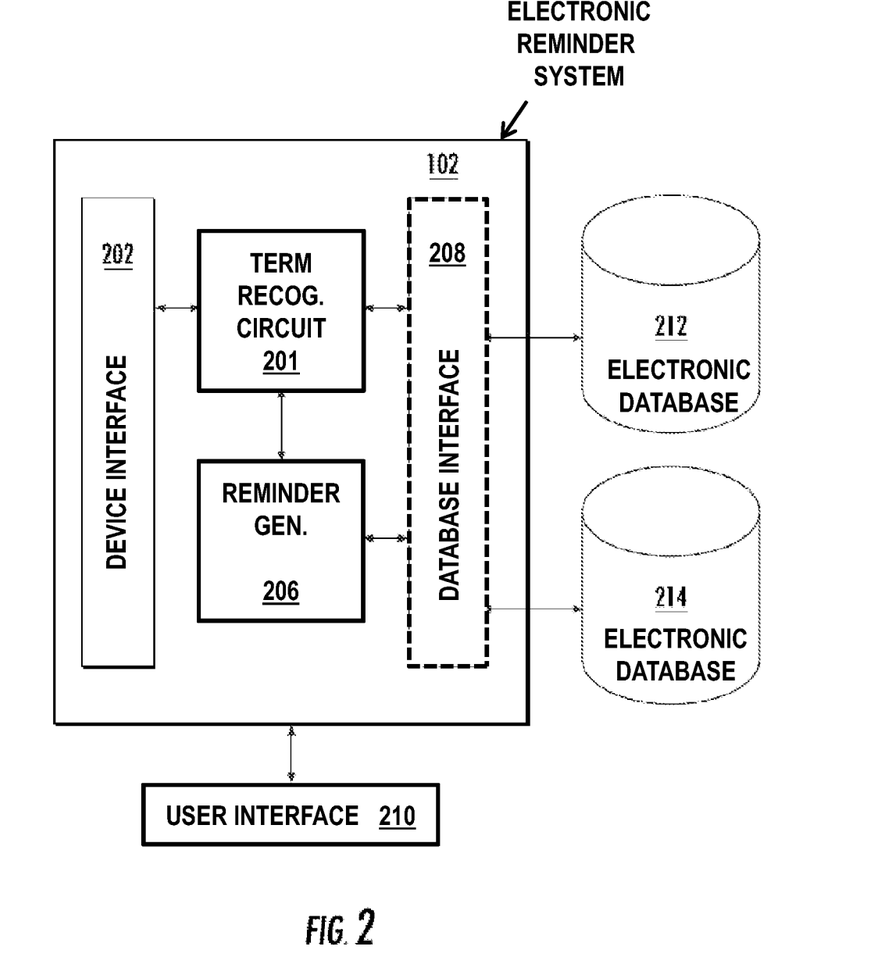
FIG. 2 is a more detailed schematic view of the system shown in FIG. 1.

Referring additionally to FIG. 2, a more detailed schematic view is provided of the system 102 for automatically generating an electronic reminder. According to this particular embodiment, the system illustratively includes a device interface 202 adapted to communicatively link to a communications system or device. The system 102 also illustratively includes term-recognition circuitry 204 connected with the device interface 202. The system 102 further illustratively includes a reminder generator 206 connected to the term-recognition circuitry 204. Optionally, the system 102 can communicatively link to a separate user interface 210 for receiving and conveying voice- and/or text-based input and output.

Thus, although as noted already, a system-generated reminder can be conveyed by the system 102 to the same communication device on which a message is received or to a different communication device, a reminder can also comprise output rendered through the optional user interface 210. Additionally, or alternatively, the system 102 can also include yet another interface 208 for linking to one or more databases 212, 214. In different embodiments described below, the system 102 can read data from the one or more databases 212, 214, as well as write data to the databases.

The term-recognition circuitry 204 and reminder generator 206 are preferably implemented in a combination of logic-based circuitry and processor-executable code for effecting the procedures, processes, and functions described herein. Thus, in one embodiment, the term-recognition circuitry 204 and reminder generator 206 can be implemented in a general-purpose or application-specific computing device, one having one or more processors comprising registers, arithmetic-logic units, and a controller for carrying out the procedures, processes, and functions based on instructions contained in processor-executable code. Accordingly, the functionality of the system 102, in one embodiment, can be made available to subscribers through a service provider that operates and maintains the system for different service subscribers. Alternatively, the system 102 can be implemented in dedicated hardwired circuitry configured to perform the same procedures, processes, and functions. In any event, the system 102 can be integrated into or remotely located away from a user's communication device.

Operatively, the term-recognition circuitry 204 is configured to identify at least one key term within an electronic message received by a communications system or device. The reminder generator 206 communicatively linked to the term-recognition circuitry 204 is configured to generate at least one reminder based upon at least one key term so identified. If no key term is identified, no reminder is generated by the reminder generator 206. When at least one key term is identified by the term-recognition circuitry 204 so that a reminder is generated by the reminder generator 206, the reminder generator 206 is further configured to convey to a user one or more reminders at a time later than when the message was received.

In one embodiment, the electronic message comprises text. Accordingly, the system 102 can comprise a text-recognition engine (not explicitly shown) for recognizing text elements. The term-recognition circuitry 204 thus can be configured to identify the at least one key term by parsing terms contained in the text and comparing the parsed terms to a plurality of pre-determined terms stored in an electronic database 212 to determine whether any parsed term corresponds to one or more pre-determined terms. As used throughout the description of various embodiments set forth herein, the intended meaning of "term" in the context of text encompasses an alphabetic or other symbol, strings of alphabetic characters comprising distinct words, as well as phrases containing two or more words. In the context of voice, the meaning of "term" encompasses spoken utterances, including words and other recognizable sounds, for expressing human thoughts.

In another embodiment, the electronic message comprises one or more voice utterances. The term-recognition circuitry 204 is thus configured to identify the at least one key term by identifying distinct terms within the voice utterance and compare each distinct term with a plurality of pre-determined terms stored in an electronic database 212 to determine whether any distinct term corresponds to one or more pre-determined terms. In a particular embodiment, the system 102 includes a speech-recognition engine (not shown). A digital signal processor (DSP) (also not shown) can be used to sample received speech and convert the received speech into digital representations. The recognized speech can be converted by a speech-to-text engine and then compared to text-based terms stored in an electronic database 212. Alternatively, recognized speech, in digital form, can be compared directly to the pre-determined terms stored in digital form in the electronic database 212.

In a particular embodiment, the user can specify one or more terms by supplying input to the optional user interface 210. The system can electronically store the one or more terms within the electronic database 212. The term may or may not correspond one-to-one to key terms, but rather may correspond to an alternate but equivalent or merely a similar term. The equivalent or similar term can then be deemed to be a key term in the context of the processes, procedures, and functions already described. Accordingly, the term-recognition circuitry 204 can be configured to subsequently compare the one or more user-supplied terms to terms contained within the received electronic message to determine whether the received electronic message contains at least one key term.

Figure 3:
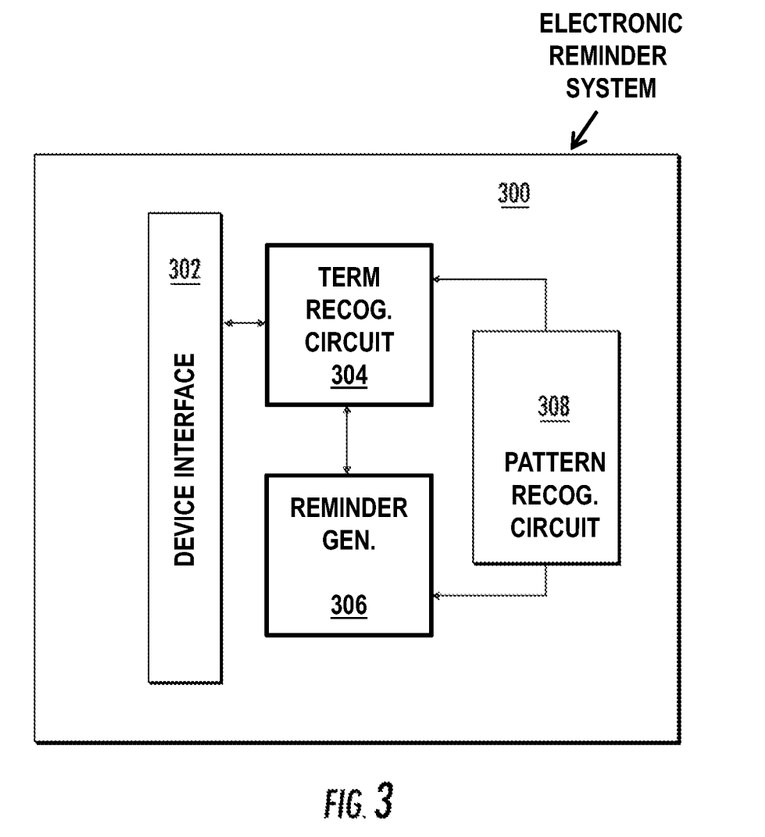
FIG. 3 is a schematic view of a system for automatically generating an electronic reminder, according to another embodiment

FIG. 3 is a schematic view of a system 300 for automatically generating an electronic reminder, according to an alternative embodiment. The system 300 comprises a communication-device interface 302, term-recognition circuitry 304, and remainder generator 306, each having structure and functionality as already described. Additionally, however, the system 300 includes pattern-recognition circuitry 308 operatively linked to the term-recognition circuitry 304 and remainder generator 306. The pattern-recognition circuitry 308 can be implemented in a combination of one or more processors and processor-executable code configured to execute when loaded on the one or more processors. Alternately, the pattern-recognition circuitry 308 can be implemented in dedicated hardwired circuitry for performing the same processes, procedures, and functions effected by a combination of processor and processor-executable code.

Regardless of the particular implementation, the pattern-recognition circuitry 308 is configured to recognize behavioral patterns of a user and, based on a recognized pattern of behavior, to generate at least one reminder. More particularly, the pattern-recognition circuitry can be configured to recognize behavioral patterns based on known techniques of statistically-based pattern recognition, neural networks, machine learning, or artificial intelligence.

For example, the pattern-recognition circuitry 308 can be configured to recognize the number of times that certain key terms appear in a communication within a certain distance of one another. One such measure of distance, if the key terms are distinct words, is how many words separate any given pair of key terms in a communication. If the number of separating words is equal to or less than a predetermined threshold, then the measured distance between the pair of key terms is determined by the pattern-recognition circuitry 308 to be significant. When combinations of key terms are determined to be significant, the pattern-recognition circuitry 308 can ascertain whether the combinations deemed significant elicit from the user a reminder; that is, does the user manually enter a reminder following a message containing a combination of key terms having been determined to be significant. If so, the pattern-recognition circuitry can determine whether the frequency or correlation is statistically significant based upon known statistical techniques. If the frequency or correlation is equal to or greater than a predetermined threshold, the pattern-recognition circuitry 308 can instruct the term-recognition circuitry 304 to identify the key terms in subsequent electronic messages and instruct the remainder generator 306 to construct an appropriate reminder whenever the key terms are identified.

Figure 4:
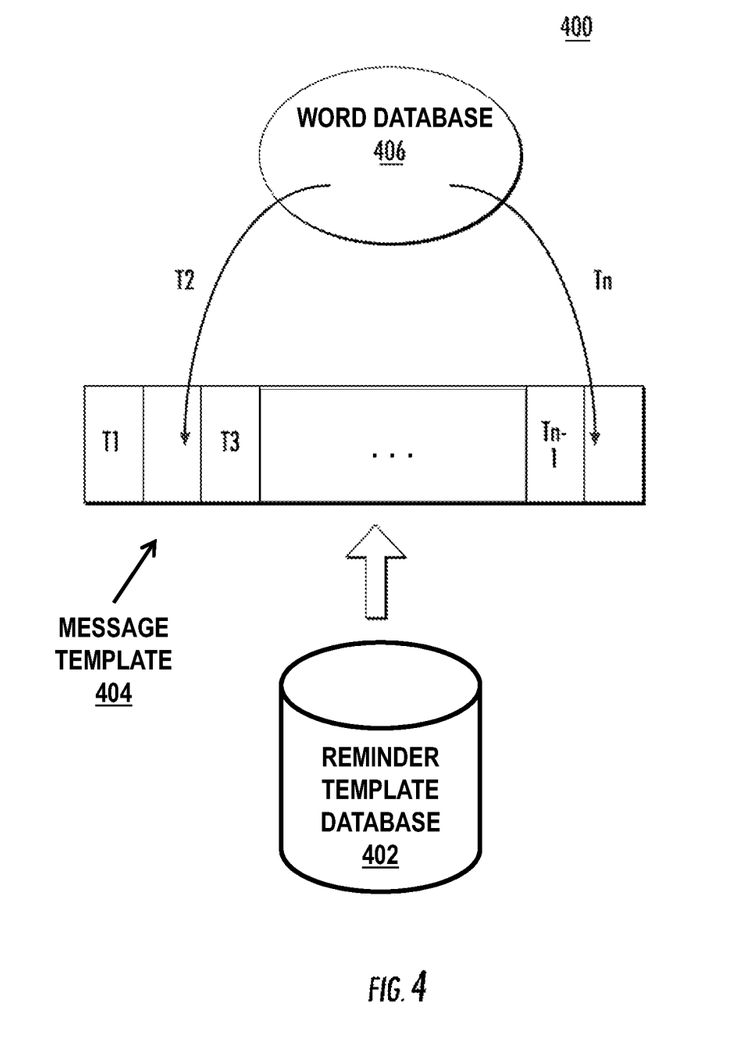
FIG. 4 is a schematic view of certain operative features of the systems illustrated in FIGS. 2 and 3.

As already noted a system 102, 300 for automatically generating an electronic reminder, according to any of embodiments described can read from and write to one or more databases. One such database can be a database comprising templates that form the basis for distinct reminders generated. FIG. 4 schematically illustrates certain operative features 400 of a system for automatically generating an electronic reminder using such a database 402. In response to identifying one or more particular key terms, the reminder generator 204, 304 selects from the database 402 a corresponding message temple 404. The template 404 can be a character string comprising a particular phrase, for example. The reminder generator 204, 304 is configured to generate at least one reminder by selecting from a word database 406 one or more words T1, Tn to insert in the template 404 at specified locations to compose a reminder.

Figure 5:
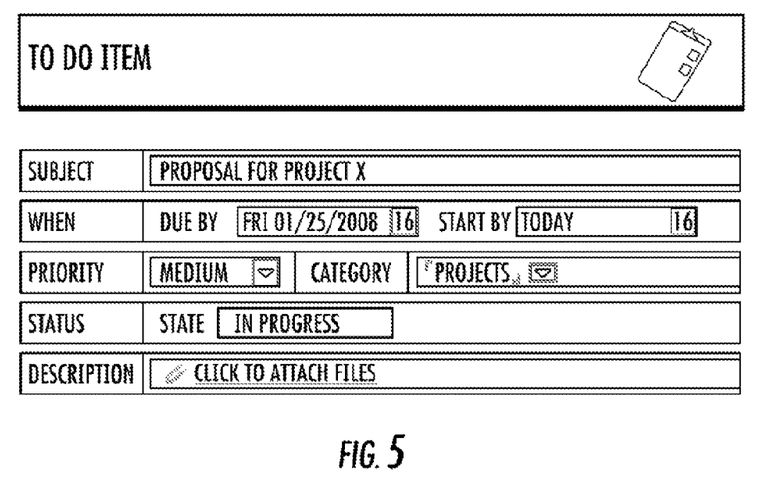
FIG. 5 is an exemplary graphical user interface comprising a reminder generated according to one embodiment of the invention.

Alternatively, the message generator can generate a graphical user interface view into which terms have been inserted in specified fields. FIG. 5 provides an exemplary view according to this embodiment. The exemplary view is based on a hypothetical scenario in which a manger sends an e-mail to his employee, stating:

"John,
I talked to Alex about Project X and he thinks it is a great idea. Please submit the proposal for Project X by January 25.
Thanks,
Ed."

It is assumed that the user has previously set "to-do" key words that include date, submit, and due. The system 102, 300 performing the already-described procedures, recognizing the key words and generates the reminder shown in the figure.

Figure 6:
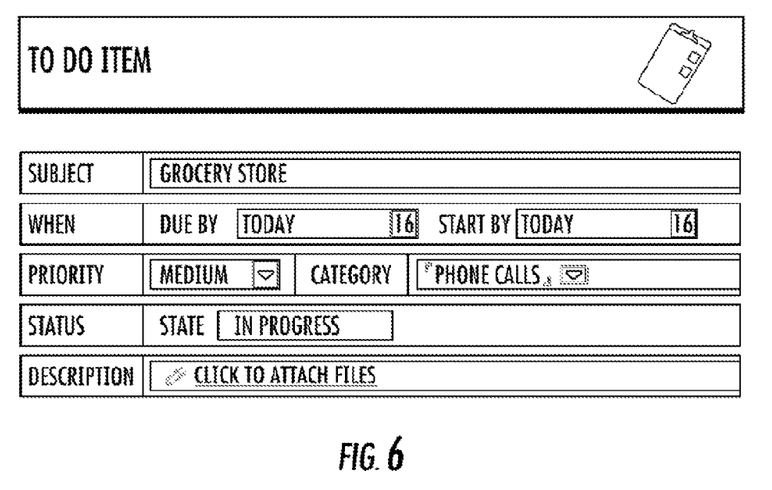
FIG. 6 is an exemplary graphical user interface comprising a reminder generated according to a different embodiment of the invention.

FIG. 6 is based on a hypothetical scenario in which a woman is speaking with her husband over a phone line. The woman requests her husband stop at a grocery store and purchase certain items. Based on similar conversations in the past, pattern-recognition circuitry 308 has correlated these conversations with reminders previously entered by the woman's husband. Accordingly, the system automatically responds to the following phone conversation:

Wife: "James, we need a few items from the grocery for our dinner party Friday. Would you stop by the grocery store and get 3 pounds of meat, crackers, and shredded cheese?"
Husband: "OK."
Wife: "Alright, see you at seven."
Husband: "Bye."

The system 300 responds by generating the reminder later displayed on a terminal of the husbands computer at work. After the creation of the "to-do" reminder, notification follows settings previously set by a user.

In still other embodiments, the system 102, 300 can be configured with control circuitry for performing related functions related to the generation of a reminder. The system 102, 300 can include, for example, control circuitry configured to determine when at least one reminder is conveyed to the user based upon a user-supplied input. The control circuitry can be configured to determine the number of times one or more reminders are conveyed to the user based upon the user input. Additionally, or alternatively, the control circuit can be configured to block delivery of a reminder, for example, at particular times, to the user based upon the user input.

Figure 7:
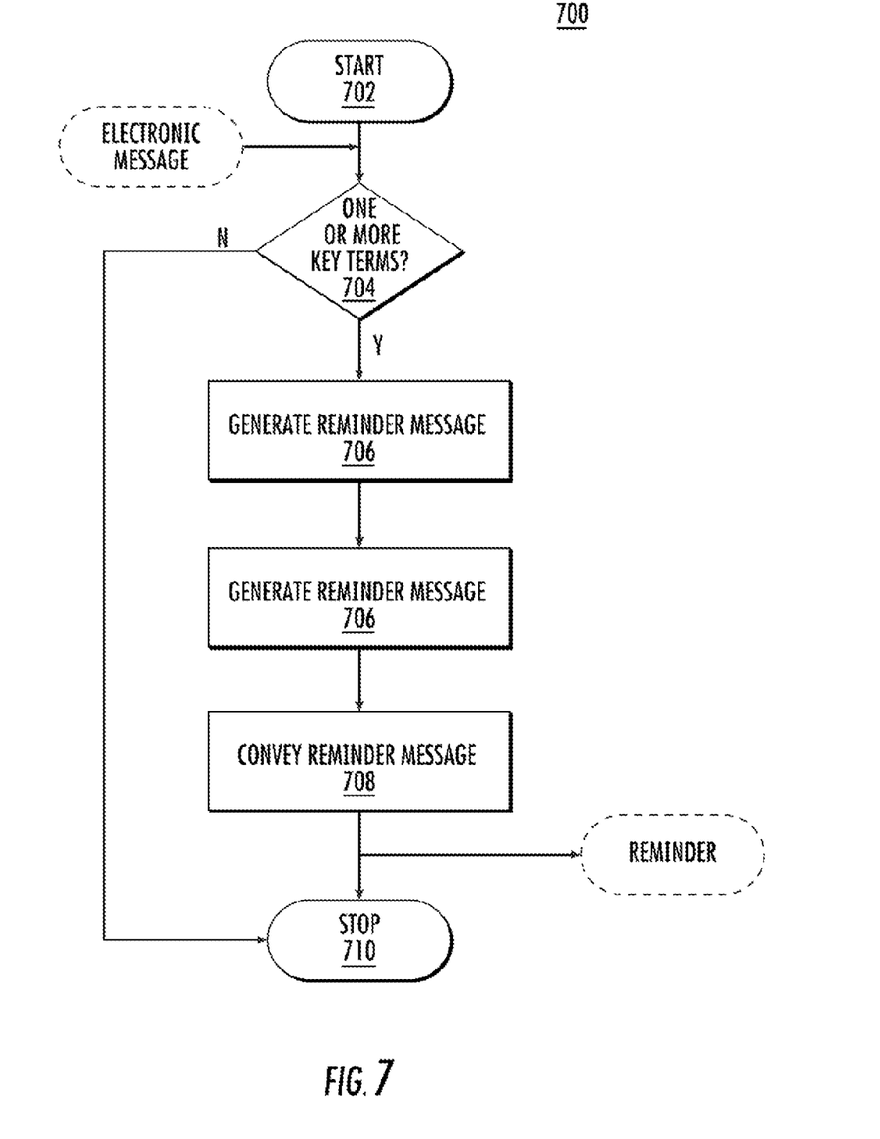
FIG. 7 is a flowchart of exemplary steps illustrating a method of automatically generating an electronic reminder, according to still another embodiment of the invention.

FIG. 7 further illustrates certain method aspects of the invention. FIG. 7 is a flowchart of exemplary steps illustrating a method 700 of automatically generating an electronic reminder, according to still another embodiment of the invention. The method 700 illustratively includes, after the start at block 702, determining at block 704 whether one or more key terms is contained in an electronic message, and if so identifying using term-recognition circuitry the one or more key terms at block 706. The method 700 then continues at block 708 by generating at least one reminder based upon at least one key term, the at least one reminder being electronically conveyed to a user at a time later than when the message was received. The method 700 illustratively concludes at block 710.

According to one embodiment of the method 700, the electronic message comprises text, and the step of identifying at least one key term at block 706 comprises parsing terms contained in the text and comparing the parsed terms to a plurality of pre-determined terms stored in an electronic database so as determine whether any parsed term corresponds to one or more pre-determined terms. More particularly, the step can be performed using a computer-implemented parser for segmenting text and/or voice utterances into component part of speech to determine a meaning based on the form, function, and syntactical relationship of each part.

In another embodiment, the electronic message comprises a voice utterance. Accordingly, the step of identifying at least one key term at block 706 comprises identifying distinct terms within the voice utterance and comparing each distinct term with a plurality of pre-determined terms stored in an electronic database so as to determine whether any distinct term corresponds to one or more predetermined terms.

The method 700 can also include the step of recognizing a behavioral pattern of the user using pattern-recognition circuitry and generating at least one reminder based upon the recognized behavioral pattern. Alternately, the method can include receiving user input specifying at least one term and electronically storing the at least one term with in an electronic database for subsequently comparing the at least one term to terms contained within the received electronic message to determine whether the received electronic message contains at least one key term.

In one embodiment, wherein the step of generating at least one reminder at block 708 comprises selecting from a database a stored reminder template and inserting at least one reminder term in the reminder template.

Additionally, or alternatively, the method 700 can comprise receiving a user input specifying at least one among a timing instruction for determining when the at least one reminder is conveyed to the user, a limit instruction for determining the number of times one or more reminders are conveyed to the user, and a blocking instruction for blocking delivery of the reminder to the user.

The invention, as also already noted, can be embedded in a computer program product, such as magnetic tape or optically-readable disk having computer-readable code defining a computer program embedded therein. The computer-readable code, when loaded to and executed by a computer system, implements the methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method of automatically generating an electronic reminder, the method comprising:
searching an electronic communications received with an electronic communications device, using term-recognition circuitry, to identify a plurality of key terms within a conversation conveyed in the electronic communications;
recognizing a behavioral pattern associated with the electronic communications using pattern-recognition circuitry based on an arrangement of the plurality of key terms in the electronic communications; and
generating, without user intervention, at least one reminder for a user associated with the electronic communication based upon the plurality of key terms and one or more other terms in the electronic communications associated with the plurality of key terms, the generating of the at least one reminder comprising:
identifying a plurality of different pre-defined reminder templates corresponding to the plurality of key terms,
selecting from the plurality of different pre-defined reminder templates at least one reminder template corresponding to one or more previous reminders for the user associated with the recognized behavioral pattern in at least one other electronic communications, and
inserting the other terms into the at least one pre-defined reminder template to yield the at least one reminder for the user, the at least one reminder being electronically conveyed to the user at a time later than when the message was received.

2. The method of claim 1, wherein the electronic communications comprises text, and wherein the step of searching to identify the plurality of key terms comprises parsing terms contained in the text and comparing the parsed terms to a plurality of pre-determined terms stored in an electronic database to determine whether any parsed term corresponds to one or more pre-determined terms.

3. The method of claim 1, wherein the electronic communications comprises a voice utterance, and wherein the step of searching to identify the plurality of key terms comprises identifying distinct terms within the voice utterance and comparing each distinct term with a plurality of pre-determined terms stored in an electronic database to determine whether any distinct term corresponds to one or more pre-determined terms.

4. The method of claim 1, further comprising receiving user input specifying at least one term and electronically storing the at least one term with in an electronic database for subsequently comparing the at least one term to terms contained within the received electronic message to determine whether the received electronic message contains the plurality of key terms.

5. The method of claim 1, further comprising receiving a user input specifying at least one among a timing instruction for determining when the at least one reminder is conveyed to the user, a limit instruction for determining the number of times one or more reminders are conveyed to the user, and a blocking instruction for blocking delivery of the reminder to the user.

6. A system for automatically generating an electronic reminder, the system comprising:
a processor;
a device interface module for configuring the processor to communicatively link to a communications device;
a term-recognition circuitry module for configuring the processor for searching an electronic communications received with the electronic communications device to identify a plurality of key terms within a conversation conveyed in the electronic communications;
a pattern-recognition circuitry module for configuring the processor for recognizing a behavioral pattern associated with the electronic communications based on an arrangement of the plurality of key terms in the electronic communications; and a reminder generator module for configuring the processor for generating, without user intervention, at least one reminder for a user associated with the electronic communication based upon the plurality of key terms and one or more other terms in the electronic communications associated with the plurality of key terms, the generating of the at least one reminder comprising:
identifying a plurality of different pre-defined reminder templates corresponding to the plurality of key terms,
selecting from the plurality of different pre-defined reminder templates at least one reminder template corresponding to a previous reminder for the user associated with the recognized behavioral pattern in at least one other electronic communications, and
inserting the other terms into the at least one pre-defined reminder template to yield the at least one reminder for the user, the at least one reminder being based upon the at least one key term and being electronically conveyed to the user at a time later than when the message was received.

7. The system of claim 6, wherein the electronic communications comprises text, and wherein the term-recognition circuitry module further configures the processor to perform the searching to identify the plurality of key terms by parsing terms contained in the text and compare the parsed terms to a plurality of pre-determined terms stored in an electronic database to determine whether any parsed term corresponds to one or more pre-determined terms.

8. The system of claim 6, wherein the electronic communications comprises a voice utterance, and wherein the term-recognition circuitry module further configures the processor to perform the searching to identify the plurality of key terms by identifying distinct terms within the voice utterance and comparing each distinct term with a plurality of pre-determined terms stored in an electronic database to determine whether any distinct term corresponds to one or more pre-determined terms.

9. The system of claim 6, further comprising a user interface module for configuring the processor for receiving user input specifying at least one term and for electronically storing the at least one term within an electronic database, and wherein the term-recognition circuitry module further configures the processor to subsequently compare the at least one term to terms contained within the received electronic message to determine whether the received electronic message contains the plurality of key terms.

10. The system of claim 6, further comprising a user input device for receiving a user input and a control circuitry module for configuring the processor to perform at least one among determining when the at least one reminder is conveyed to the user based upon the user input, determining the number of times one or more reminders are conveyed to the user based upon the user input, and blocking delivery of the reminder to the user based upon the user input.

11. A non-transitory computer-readable medium in which computer-readable code is embedded, wherein when loaded on and executed by a computer system, the computer-readable code causes the computer system to perform the steps of:

recognizing a behavioral pattern associated with the electronic communications using pattern-recognition circuitry based on an arrangement of the plurality of key terms in the electronic communications; and
generating, without user intervention, at least one reminder for a user associated with the electronic communication based upon the plurality of key terms and one or more other terms in the electronic communications associated with the plurality of key terms, the generating of the at least one reminder comprising:
identifying a plurality of different pre-defined reminder templates corresponding to the plurality of key terms,
selecting from the plurality of different pre-defined reminder templates at least one reminder template corresponding to a previous reminder for the user associated with the recognized behavioral pattern in at least one other electronic communications, and
inserting the other terms into the at least one pre-defined reminder template to yield the at least one reminder for the user, the at least one reminder being electronically conveyed to the user at a time later than when the message was received.

12. The non-transitory computer-readable medium of claim 11, wherein the electronic message comprises text, and wherein the step of searching an electronic communications to identify the plurality of key terms comprises parsing terms contained in the text and comparing the parsed terms to a plurality of pre-determined terms stored in an electronic database to determine whether any parsed term corresponds to one or more pre-determined terms.

13. The non-transitory computer-readable medium of claim 11, wherein the electronic message comprises a voice utterance, and wherein the step of searching an electronic communications to identify the plurality of key terms comprises identifying distinct terms within the voice utterance and comparing each distinct term with a plurality of pre-determined terms stored in an electronic database to determine whether any distinct term corresponds to one or more pre-determined terms.

14. The non-transitory computer-readable medium of claim 11, further comprising computer-readable code for causing the computer system to perform at least one among determining when the at least one reminder is conveyed to the user based upon a user input, determining the number of times one or more reminders are conveyed to the user based upon a user input, and blocking delivery of the reminder to the user based upon a user input.

15. The non-transitory computer-readable medium of claim 11, further comprising computer-readable code for causing the computer system to electronically store, based upon user input, at least one user-supplied term with in an electronic database and subsequently compare the at least one user-supplied term to terms contained within the received electronic message to determine whether the received electronic message contains the plurality of key terms.

* * * * *